United States Patent
Dalton et al.

(10) Patent No.: US 7,623,650 B2
(45) Date of Patent: Nov. 24, 2009

(54) UNIVERSAL MULTI-BROWSER INTERFACE FOR CUSTOMER SERVICE REPRESENTATIVES

(75) Inventors: John W. Dalton, Malvern, PA (US); Jeffrey E. Dowds, Norristown, PA (US); James G. Lehman, Exton, PA (US); Catherine B. Krauss, Downingtown, PA (US); Saundra K. Lanyon, Royersford, PA (US); Richard Dalton, Douglassville, PA (US)

(73) Assignee: The Vanguard Group, Inc., Malvern, PA (US)

( * ) Notice: Subject to any disclaimer, the term of this patent is extended or adjusted under 35 U.S.C. 154(b) by 844 days.

(21) Appl. No.: 10/910,199

(22) Filed: Aug. 3, 2004

(65) Prior Publication Data

US 2006/0031077 A1 Feb. 9, 2006

Related U.S. Application Data

(60) Provisional application No. 60/584,109, filed on Jun. 30, 2004.

(51) Int. Cl.
*H04M 3/00* (2006.01)
*H04M 5/00* (2006.01)

(52) U.S. Cl. ............................. 379/265.01; 379/265.02; 379/265.09; 379/266.1; 379/309; 705/1

(58) Field of Classification Search ............ 379/265.01, 379/265.02, 265.09, 266.1, 309; 705/1
See application file for complete search history.

(56) References Cited

U.S. PATENT DOCUMENTS

| | | | |
|---|---|---|---|
| 5,267,148 A | 11/1993 | Kosaka et al. | |
| 5,862,330 A | 1/1999 | Anupam et al. | |
| 5,933,816 A | 8/1999 | Zeanah et al. | |
| 5,974,135 A | 10/1999 | Breneman et al. | |
| 5,991,796 A | 11/1999 | Anupam et al. | |
| 6,012,042 A | 1/2000 | Black et al. | |
| 6,012,044 A | 1/2000 | Maggioncalda et al. | |
| 6,070,185 A | 5/2000 | Anupam et al. | |
| 6,108,711 A | 8/2000 | Beck et al. | |

(Continued)

OTHER PUBLICATIONS

Esenther, Alan W., "Instant Co-Browsing: Lightweight Real-Time Collaborative Web Browsing," Conference Proceedings of the Eleventh International World Wide Web Conference (WWW2002), May 2002, 11 pp., Honolulu, HI.

(Continued)

*Primary Examiner*—Quynh H Nguyen
(74) *Attorney, Agent, or Firm*—RatnerPrestia

(57) ABSTRACT

A computer-implemented method for providing customer service, comprising providing an external user interface (UI) remotely accessible by customers via a global computer information network; providing an internal UI accessible by call-center customer service representatives (CSRs); retrieving from databases and displaying information on the internal and external UIs; automatically storing information entered via the internal UI and information entered via the external UI in the databases; and receiving and automatically processing instructions entered via the internal UI and instructions entered via the external UI. The internal and external UI each include a shared website browser that displays information in a specific format, has a specific functionality, and receives information for processing. The internal UI also comprises one or more limited access browsers accessible only by the CSR, including a client search and/or data display browser; a contact history browser; a customer needs assessment browser, or a combination thereof.

19 Claims, 14 Drawing Sheets

U.S. PATENT DOCUMENTS

| | | | |
|---|---|---|---|
| 6,151,020 | A | 11/2000 | Palmer et al. |
| 6,192,394 | B1 | 2/2001 | Gutfreund et al. |
| 6,196,846 | B1 | 3/2001 | Berger et al. |
| 6,212,178 | B1 | 4/2001 | Beck et al. |
| 6,230,171 | B1 | 5/2001 | Pacifici et al. |
| 6,230,197 | B1 | 5/2001 | Beck et al. |
| 6,253,228 | B1 | 6/2001 | Ferris et al. |
| 6,295,551 | B1 | 9/2001 | Roberts et al. |
| 6,349,290 | B1 | 2/2002 | Horowitz et al. |
| 6,360,250 | B1 | 3/2002 | Anupam et al. |
| 6,377,944 | B1 | 4/2002 | Busey et al. |
| 6,411,989 | B1 | 6/2002 | Anupam et al. |
| 6,430,567 | B2 | 8/2002 | Burridge |
| 6,487,195 | B1 | 11/2002 | Choung et al. |
| 6,581,105 | B2 | 6/2003 | Miloslavsky et al. |
| 6,668,273 | B1 | 12/2003 | Rust |
| 6,675,216 | B1 | 1/2004 | Quatrano et al. |
| 6,687,877 | B1 * | 2/2004 | Sastry et al. ............... 715/201 |
| 6,732,145 | B1 | 5/2004 | Aravamudan et al. |
| 6,748,420 | B1 * | 6/2004 | Quatrano et al. ............ 709/205 |
| 6,754,693 | B1 | 6/2004 | Roberts et al. |
| 6,826,194 | B1 * | 11/2004 | Vered et al. .................. 370/449 |
| 6,871,213 | B1 | 3/2005 | Graham et al. |
| 6,950,852 | B1 | 9/2005 | Kobayaghi et al. |
| 7,003,550 | B1 | 2/2006 | Cleasby et al. |
| 7,043,529 | B1 | 5/2006 | Simonoff |
| 7,051,068 | B1 | 5/2006 | Kawase et al. |
| 7,062,465 | B1 | 6/2006 | Shafiee et al. |
| 7,127,495 | B2 | 10/2006 | Brown et al. |
| 7,130,885 | B2 | 10/2006 | Chandra et al. |
| 7,149,776 | B1 | 12/2006 | Roy et al. |
| 7,174,505 | B2 | 2/2007 | Nakagawa et al. |
| 2001/0044676 | A1 | 11/2001 | Macleod Beck et al. |
| 2001/0054064 | A1 * | 12/2001 | Kannan ...................... 709/203 |
| 2002/0016788 | A1 | 2/2002 | Burridge |
| 2002/0038388 | A1 | 3/2002 | Netter |
| 2002/0138624 | A1 | 9/2002 | Esenther |
| 2003/0105819 | A1 | 6/2003 | Kim et al. |
| 2004/0083113 | A1 * | 4/2004 | Cao et al. ...................... 705/1 |
| 2004/0133639 | A1 | 7/2004 | Shuang et al. |

OTHER PUBLICATIONS

Esenther, Alan W., "Instant Co-Browsing: Lightweight Real-Time Collaborative Web Browsing," Conference Proceedings of the Eleventh International World Wide Web Conference (WWW2002), May 2002, 4 pp., Honolulu, HI.

Jacobs, S., et al., "Filing HTML Forms Simultaneously: CoWeb Architecture and Functionality," Computer Networks and ISDN Systems, May 1996, n.28, pp. 1385-1395.

Kobayashi, M., et al., "Collaborative Customer Services Using Synchronous Web Browser Sharing," Proceedings of the 1998 ACM Conference on Computer Supported Cooperative Work, Nov. 14-18, 1998, p. 99-108, ACM Press, New York, NY, U.S.

Puglia, S., et al, "MultiECommerce: A Distributed Architecture for Collaborative Shopping of the WWW," Proceedings of the $2^{nd}$ ACM Conference of Electronic Commerce, Oct. 17-20, 2000, p. 215-224, ACM Press, New York, NY, U.S.

* cited by examiner

☐ Window Controller - Processing - Vanguard
Processing & Inquiry  Administration

| AWD | Desktop | Transaction | Refresh | New Window | No Action |

Quick search - Search tips

| | Search | Other search | Previous search | DJIA |
| JOHN DOE | SSN 000-00-0000 | Detail Search | Select one ▼ | Select one ▼ | Nasdaq |
| | | | HIPO Core/not registered | | 20-min 06:13 |

Vanguard - Portfolio Overview

← Back ▼ ⇑ ▼ ⊗ 🔄 📋 | 🔍 Search | ✚ Favorites | 🖼 Media | 💬 | ✉ | ▼ | 🔲 | Links »

Questions? Contact us

Personal Investors  forms & literature | news & views | search | site help | log off 🔵 open an account | Home | My Portfolios | Research Funds & Stocks | Services | Planning & Advice | Buy & Sell Key Data | Overview | Accounts & Activity | Portfolio Analysis | Performance | Statements | Account Options | >> My Profile

My Profile

Personal Information
Address & phone information
View/change your address information (including duplicate statement addresses) and phone numbers.

Change of Ownership tool
Use this tool to add, remove, or change the owners of a Vanguard® account. The Change of Ownership tool will provide the forms and instructions necessary to make this change.

Bank Information
View/change your bank information.
Bank F1 search

Beneficiaries
View/change the beneficiaries on your accounts.

E-mail address
View/change your e-mail address.

Personal profile
View/change your date of birth, percentage of total assets, or investment goals.

Client profile
View/change the client's profile.

Client to client relationships
View/change client-to-client relationships.

Enrolled services
View/change services in which the client is enrolled.

Mailing Preferences
Mail delivery preferences
Tell us whether you'd like your statements, fund prospectuses and reports, confirmations, and proxy materials delivered electronically or via U.S. mail.

E-mail newsletters
Subscribe/unsubscribe to e-mail newsletters.

Security and Permissions
Online account access
See the accounts you can access and who has permission to access your accounts.

Security information
View/change the security information you use to log on.

Mutual fund account freezes

Exchange/Redemption options

Legal documents

Tele-Account® PIN

VRU access

Block accounts/holdings

I want to...
Add, view or change my account options

See the client's clerical history

Get forms and literature

UNIVERSAL MULTI-BROWSER INTERFACE FOR CUSTOMER SERVICE REPRESENTATIVES

CROSS-REFERENCE TO RELATED APPLICATIONS

This application claims priority to U.S. Provisional Application Ser. No. 60/584,109, incorporated herein by reference, filed Jun. 30, 2004, titled MULTI-BROWSER INTERFACE FOR A TELEPHONE-BASED CUSTOMER SERVICE REPRESENTATIVE, and listing John W. Dalton, Jeffrey E. Dowds, and James G. Lehman as inventors.

FIELD OF THE INVENTION

This invention relates to computerized user interfaces, specifically user interfaces used by customer service representatives (CSRs), and more specifically used by CSRs in the financial services industry.

BACKGROUND OF THE INVENTION

The way in which service providers interface with customers has evolved in recent years from the traditional face-to-face meetings, telephone contacts, and communications received by fax and mail, to now include contacts through global computer information networks, such as the Internet or World Wide Web, either through e-mail or through direct customer access of a service provider's website. In some fields of business, for example in the financial services industry, secure website access allows customers to review their portfolios of investments, track historical and day-to-day investment performance, and research potential new investment opportunities, as well as make changes to their investment holdings or customer information profiles via the website. Nonetheless, customers still frequently need to communicate with customer service providers by more traditional routes, most often by telephone or mail. Customers used to the responsiveness of secure website access may expect at least the same level of responsiveness from telephone call-center customer service representatives (CSRs), who need to be able to access information quickly about the customer on the other end of the line.

It can therefore be a disadvantage if a CSR, while on the telephone with the customer, is forced to rely on "legacy" information systems that pre-date the secure web interface used by the caller, particularly if the CSR cannot quickly find the answer required by the customer. Also, where a customer requests information about navigation of the secure website, the CSR is at a disadvantage if the representative is viewing information in a different format and/or using a system having different functionality, yet has to provide navigation guidance based upon memory of the external user interface. Additionally, CSRs frequently need to access more information than what is available to the customer through the website interface. Furthermore, maintaining multiple systems for performing the same tasks—one for use by CSRs and one for use by customers—is more expensive than maintaining a single system.

Therefore, it is desirable to provide an improved customer service user interface that enhances the ability of a telephone-based CSR to service a customer who also has website access to customer information. Furthermore, it is desirable to provide a single customer service user interface that is usable by both call-center CSRs and mail-handling CSRs. Still further, it is desirable to provide an improved user interface without having to abandon pre-existing legacy information systems.

SUMMARY OF THE INVENTION

One aspect of the invention comprises a computer-implemented method for providing customer service by a service provider. The method comprises the steps of providing an external user interface remotely accessible by a customer via a global computer information network; supplying an internal user interface accessible by one or more call-center CSRs; retrieving from one or more databases and displaying information on the external user interface and the internal user interface; automatically storing in the one or more databases information entered via the external user interface and information entered via the internal user interface; and receiving and automatically processing transaction instructions entered via the external user interface and instructions entered via the internal user interface.

The external user interface comprising a shared website browser that displays information in a specific format, has a specific functionality, and receives information entered by customers for processing. The internal user interface comprises a plurality of browsers displayed on a computerized desktop. The plurality of browsers comprises (a) the shared website browser that displays information in the specific format, has the specific functionality, and receives information entered by the CSR for processing, and (b) one or more limited access browsers accessible only by the CSR. The one or more limited access browsers include one or more of: a client search browser that allows the CSR to locate computerized records for the customer; a client data browser that displays information about the customer; a contact history browser that displays previous contacts to the service provider by the customer; and a customer needs assessment browser that displays information for assisting the CSR in conversing with the customer.

In one embodiment, in which the internal user interface is also accessible by mail-processing CSRs and integrated with a computerized work distribution system, the method steps further comprise automatically populating the shared website browser and the one or more limited access browsers in the internal user interface with client information based upon information automatically communicated from the computerized work distribution system; and automatically navigating the shared website browser to one of a plurality of selected menus or screens within the shared website browser based upon the information received from the computerized work distribution system.

In another embodiment, the customer service provider may be a financial services provider, and the internal interface shared website browser may display, in additional to information viewable by the customer, critical information about the customer viewable only by the CSR and displayed with highlighting relative to information viewable by both the customer and the CSR. Also, the client search and client data browser may be integrated in a single browser that allows the CSR to both access and display critical information about the selected customer. The contact history browser may specifically display previous telephone calls, website transactions, and mail correspondence between the service provider and the selected customer.

Another aspect of the invention comprises a computerized system for facilitating interaction with a caller who calls a call center of a service provider, the system comprising means for providing the external user interface, means for supplying the internal user interface, means for storing the one or more databases, and means for receiving and automatically processing instructions received from the user interfaces, as described above.

Specifically, one computerized system comprises one or more processors and one or more memory media accessible by the one or more processors, the memory media containing the one or more databases and containing instructions for controlling the processor to carry out the method steps described above.

BRIEF DESCRIPTION OF THE DRAWINGS

FIG. 3D shows a screenshot of an exemplary internal user interface embodiment displaying information shown when selecting the "Portfolio Analysis" subtab under the "My Portfolios" tab.

FIG. 3E shows a screenshot of an exemplary internal user interface embodiment displaying information shown when selecting the "Performance" subtab under the "My Portfolios" tab.

FIG. 3H shows a screenshot of an exemplary internal user interface embodiment displaying information shown when selecting the "My Profile" subtab under the "My Portfolios" tab.

DETAILED DESCRIPTION OF THE INVENTION

Figure 1:
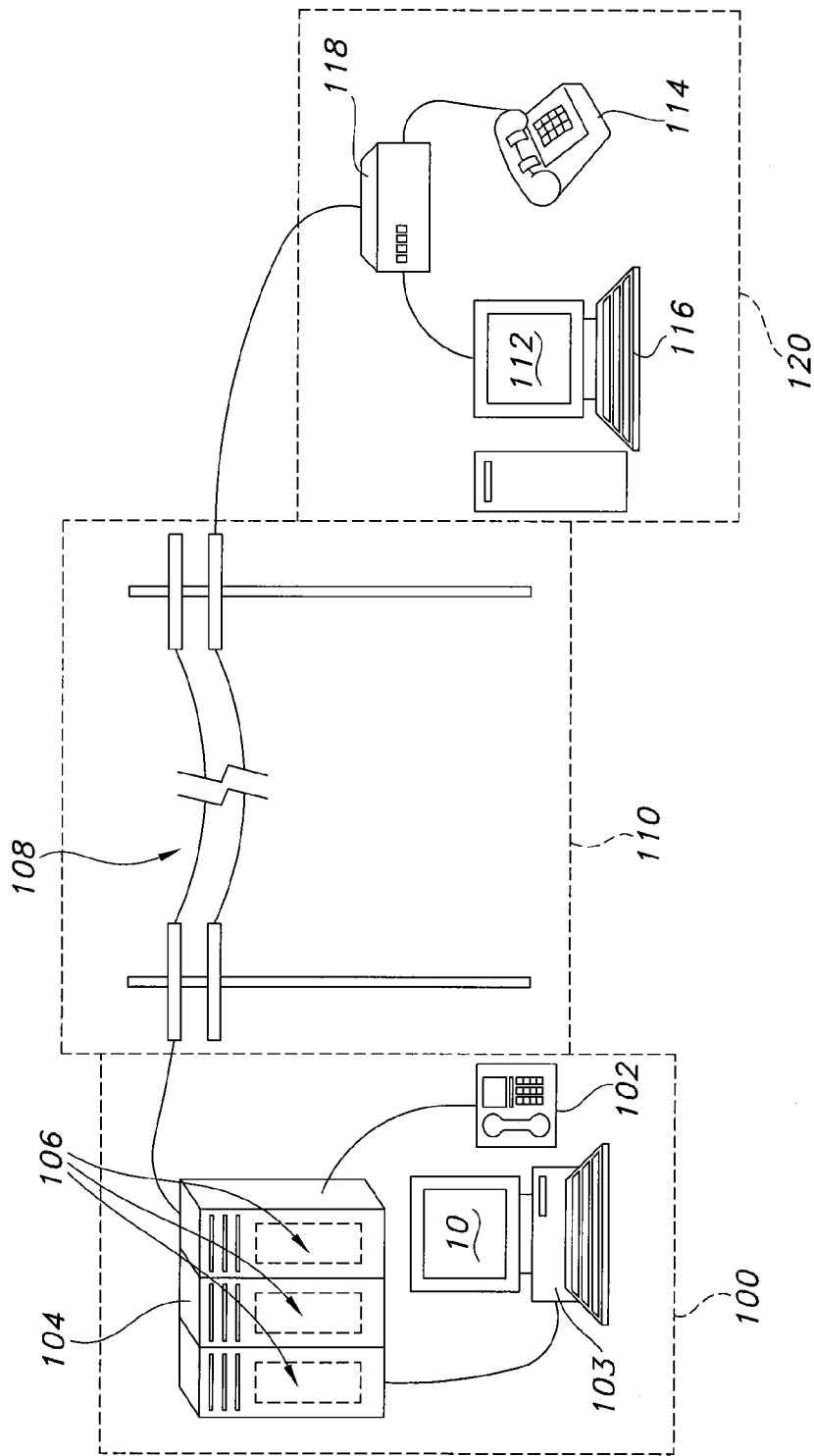
FIG. 1 shows a schematic illustration of an exemplary system for providing customer service.

The invention will next be described with reference to the figures. Referring now to FIG. 1, there is shown a schematic representation of an exemplary system for providing customer service. There are three main parts to the system—the service provider 100, the communications network 110, and the customer 120. The service provider 100 typically employs a number of CSRs (not shown), each of whom has access to a telephone 102, for conversing with customers, and a computer terminal 103, which is typically connected to a mainframe server 104 or other computer processor. The telephone system may also be linked to server 104, such as for use with an interactive voice response system. The processor 104 further has within it computer memory 106 in which one or more databases are stored. The computer memory may be fixed in any form of memory media known in the art. An exemplary processor arrangement is discussed in more detail herein in connection with FIG. 7.

Communications network 110, which includes a global computer information network, such as the Internet or World Wide Web, in addition to a voice communication network, is depicted schematically as an overland set of telephone poles and cable 108, but is not limited to any particular type of network, or any particular type of connectivity (wired or wireless). The voice and data may be on the same network or on different networks.

The customer 120 may be connected to the communications network via telephone 114 and by computer 116. Although depicted as a modem connection 118, such as is used for connection to a traditional publicly switched telephone network (PSTN), the customer may be connected to communication network 110 by any means known in the art, including but not limited to a wireless connection, voice over internet protocol (VIOP), a satellite uplink, a cable modem, a DSL line, a T1 line, and the like. However the connection is made, the customer 120 and service provider 100 are in some way linked to one another both by computer and by telephone through one or more communications networks.

Figure 2:
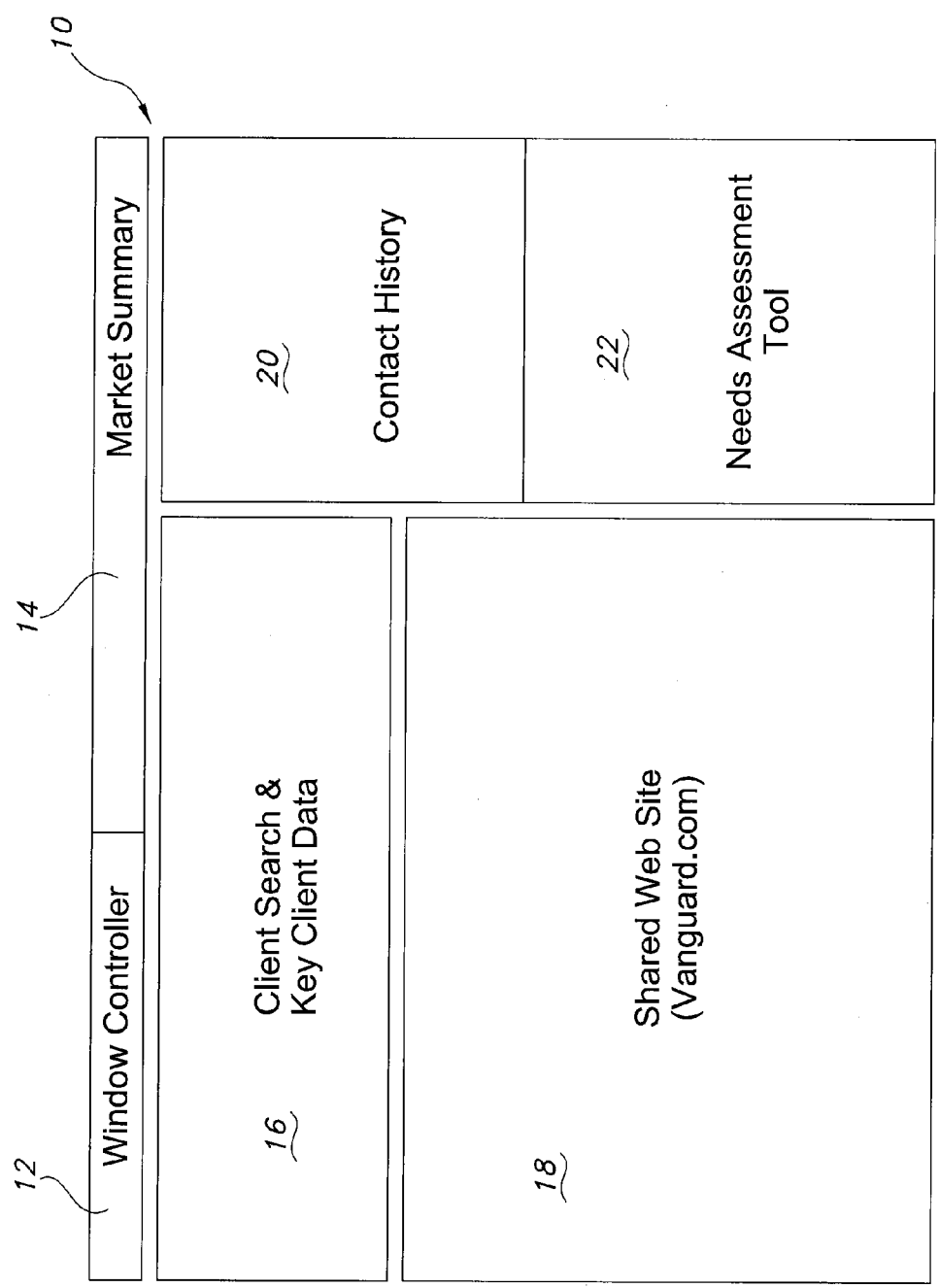
FIG. 2 shows a schematic illustration of an exemplary internal user interface embodiment.
Figure 3A:
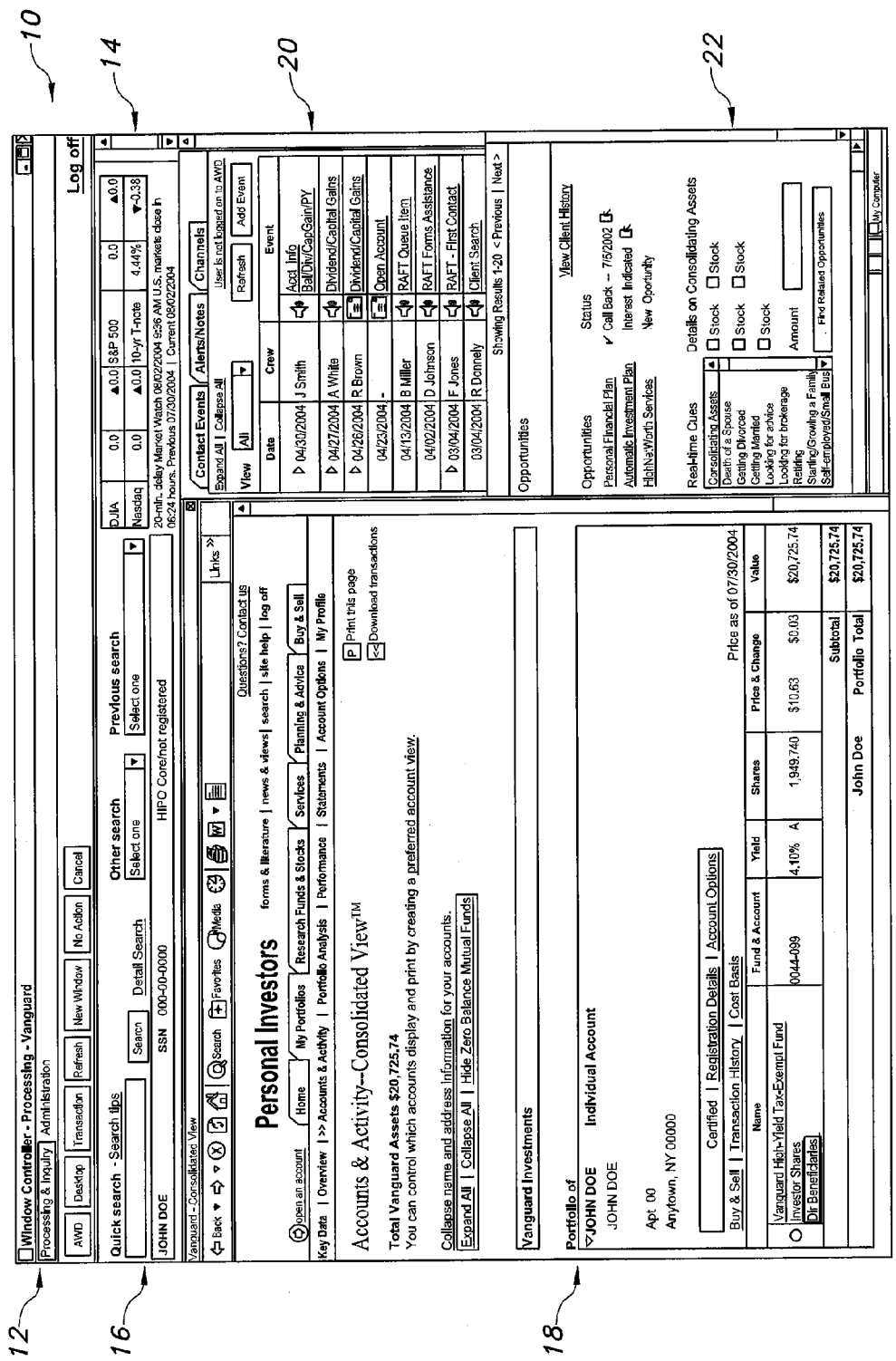
FIG. 3A shows a screenshot of an exemplary internal user interface embodiment displaying information shown when selecting the "Accounts and Activity" subtab under the "My Portfolios" tab.
Figure 3B:
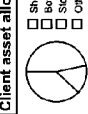
FIG. 3B shows a screenshot of an exemplary internal user interface embodiment displaying information shown when selecting the "Key Data" subtab under the "My Portfolios" tab.

The service provider 100 accesses information from the server 104 via an internal interface 10, which is shown in more detail in FIGS. 2-3B. The customer 120, via his computer 116, accesses personal information from the service provider via an external user interface 112 connected to a (typically secure) website hosted by or at least connected to server 104. It should be noted that although server 104 is depicted as a single unit in FIG. 1, the processor and memory means for carrying out the present invention may encompass a plurality of servers and/or computer memory devices, which may be distributed over a plurality of geographical locations and connected to one another via an network exclusive to the service provider and/or via a shared network such as communications network 110. Similarly, although the customer is depicted as connected to server 104 by a computer 116, the customer may be connected to server 104 by any means known in the art, including but not limited to personal computers, personal desk assistants (PDAs), cell phones, and the like.

Referring now to the schematic illustration shown in FIG. 2, the internal user interface 10 may comprises a desktop comprising a plurality of browser windows tiled together. Along the top left is shown a slot for a window controller 12, which may be a standard windows control bar, such as is known in the art for any Microsoft Windows® software package, and/or other tabs or designators that control the contents and/or format of the display. For example, as shown in the screen shots of an exemplary embodiment in FIGS. 3A and 3B, tabs for "Processing & Inquiry" and "Administration" are shown, which if selected, may produce menus of additional choices. Tabs marked "AWD", "Desktop", "Transaction", "Refresh", "New Window", and "Cancel", may be selected to view specific user interfaces (AWD, Desktop, Transaction, or New Window) corresponding to those descriptions or to perform the indicated functions (Refresh or Cancel). For example, the "New Window" tab may bring up another browser window identical to the shared web site browser 18 in a read-only format, for use by an associate to review data displayed on different pages at the same time, without having to hop back and forth between different windows on the same browser.

Optionally, a market summary 14, such as a stock ticker or summary of major indices, may be provided on the top right side, as shown in more detail in FIGS. 3A and 3B. The browser windows illustrated in the exemplary interface shown in FIG. 2 include a client search and key client data browser window 16, a shared website browser window 18, a contact history browser window 20, and a needs assessment tool browser window 22.

The client search and key client data browser window 16 may provide a user interface where the customer representative can enter the name or other identifying information, such as the social security number or telephone number, of the customer whose data the representative wants to access. Although shown as a single integrated client search and key client data browser in FIGS. 2-3B, the client search browser may be separated from the client data browser, or only a client search browser may be provided. In fact, although shown and described herein with respect to an embodiment consisting of all of browser windows 16, 18, 20, and 22, the internal user interface may include browser window 18 and any combination of one or more of browser windows 16, 20 and 22, as discussed herein. Also, a plurality of the functions described herein may be integrated into a single browser, such as the client search and key client data browser as described herein.

The CSR may enter client search information based upon information provided by the customer at the inception of the telephone call, or the client search field may be automatically populated as described herein later. Once the appropriate customer has been identified by the client search, the client data is retrieved and displayed relating to that customer. At the same time as data is retrieved and displayed on the client search browser window 16, the shared website browser 18, contact history browser 20, and needs assessment tool browser 22, may all also be populated with data retrieved from one or more relevant databases relating to that customer and displayed in formats specific to those browsers.

It should be noted that in FIG. 2, the client search and key data browser window 16 is larger and the market summary is positioned differently than in FIGS. 3A and 3B. This illustrates that the invention is not limited to any particular format. Although a substantial amount of client data may be displayed in the size window 16 shown in FIG. 2, window 16 in FIGS. 3A and 3B only shows the name, social security number, and client status information (e.g., "HIPO Core/not registered" in FIG. 3A). In the arrangement shown in FIGS. 3A and 3B, more substantial client data may be accessed using an internal-access-only "Key Data" tab within shared browser 20. FIG. 3B depicts the screen provided when the "Key Data" tab is selected.

As shown in FIG. 3B, exemplary client data displayed when the "Key Data" tab is selected, may include, but is not limited to, address information, phone numbers, e-mail address, birth date, age, gender, and a client ID number. In the exemplary screen shots illustrated in FIGS. 3A-3H, the system is used for a financial services company with whom the customer has an account, and so client account information is displayed, as is client group information (the total amount invested by all clients at that address or telephone number), where applicable.

To streamline the process of populating the browser windows with the relevant client information, the customer may first be greeted by an interactive voice response (IVR) system that requests the customer to enter information via a touch tone telephone keypad or to speak information to be converted by voice recognition software known in the art. When the incoming call from the customer is handed off to the CSR from the IVR system, the information provided by the customer may be used to automatically pre-populate the client search field or even automatically retrieve the appropriate client data from the one or more databases, and the client information may therefore automatically be populated in all of the browser windows for the CSR simultaneously with the call being handed to the representative. In an alternative embodiment, automatic number identification (ANI) software, as is well known in the art, may be used to automatically enter information in the client search browser 16 based upon the number from which the client is calling. Where name or telephone information is used as the identifier (in which case more than one customer may have the same information), a list of choices may be provided on the client search browser for selection of the appropriate individual by the CSR.

The shared website browser window 18 in the internal interface is essentially identical to the external user interface 112 (depicted in FIG. 1), except that additional information may be provided within the browser window provided to the CSR. For example, as discussed above, the "Key Data" tab and associated view may be visible only internally. The terms "internal" and "external" here are used to designate interfaces accessible by employees of the service provider (internal) and those accessible by customers of the service provider (external), but do not designate any particular geographic location. For example, an external user interface for customer use may be provided somewhere on the premises of the service provider, and an employee of the service provider may have access to the internal user interface when working from an alternate location). The shared website browser 18 in the internal user interface has the same format (screen layout) and the same functionality (the way in which the interface is navigated and used, such as using menu-driven windows, for example) as the shared website browser in the external user interface. This assures that the CSR is able to guide the customer through the customer's user interface without having to remember in his or her head what the customer interface looks like. Additional information provided to the CSR through the shared website browser window enhances the CSR's ability to provide customer service.

As noted previously, the entire screen view of Key Data shown in FIG. 3B is viewable only on the internal interface, for security reasons. Accordingly, the "Key Data" tab may be a different color than the rest of the tabs to illustrate this to the CSR. Similarly, the shared website window 18 illustrated in FIG. 3A shows certain data highlighted relative to the rest of the data, specifically the customer's social security number and status of that number in the database (i.e. "certified" as shown in FIG. 3A) and additional tabs to show Registration Details and Account Options may be displayed to the CSR, but not to the customer. The specific type of additional information available to the CSR is not critical, however, so any type of information may optionally be provided and highlighted. In one embodiment, where the client may have the ability to set preferences regarding the format of the external user interface as personalized for that user, the internal user interface may also be able to view the browser using the personalized format selected by the client, so as to be able to help the client navigate through his personally formatted version of the shared website browser. For example, the internal user interface may allow toggling back and forth between the personalized setting for that customer and the default settings. The highlighting of the information visible only to the CSR serves to remind the customer representative that the additional information is not viewable by the customer.

The contact history browser window 20 displays the last several interactions with that client. As shown in FIGS. 3A and 3B, the contact history browser window 20 is formatted as a table with columns for the date, "Crew" (CSR identifier), channel (icons), and event identifier. The icons show the means of contact, including but not limited to telephone, website, mail, voice response unit (VRU), e-mail, and the like. The "event" field shows the type of transaction or interaction that occurred on that date. Selecting the specific event may activate a pop-up screen showing more information about the event. Selecting the channel icon may bring up additional specific information, such as an audio playback of the associated telephone call by selecting that icon, or an image of the mailed information. Selecting the person listed in the "crew" field may cause display of information about that CSR, so that the CSR can be contacted for additional information about the interaction.

Although the contact history browser window only shows a limited number of interactions at a time, the CSR may have the ability to scroll through screens of additional information, as indicated in FIG. 3A ("Previous", and "Next" options displayed). Transaction events typically cause a contact history record to be automatically created. For interactions that do not cause a contact history record to be automatically created, such as a telephone call from a customer during which no action is taken, the CSR can create a contact history record. Selecting the Alerts/Notes tab generates a window that allows entry of special alerts to be displayed when the customer information is first brought onto the screen and must be acknowledged before a CSR can take any further action. For example, if a customer indicates to a CSR by telephone that he has mailed an important document, that fact can be noted in an alert. Selecting the "Channels" tab generates a display of the number of contacts by each channel and percentage of total contacts for each category of contacts.

The customer needs assessment window 22 is typically a cross-selling tool for helping to prompt the CSR to engage the customer in a dialogue that may identify additional needs of the customer serviceable by the service provider. For example, in the financial services industry, opportunities relating to financial planning, an automatic investment plan, or special services for high net worth individuals may be identified, as shown in FIG. 3A. Other topics relating to changes in marital or family status or other life events may be cued by selection from a menu. Software programs for providing this type of needs assessment are known in the art, such as, for example, INTERACTION ADVISOR software manufactured by E.piphany Inc., located in San Mateo, Calif. It should be noted that not all CSRs may have authorization or need to use the needs assessment tool with clients, and therefore access to the need assessment browser may not appear for unauthorized CSRs, as is shown in FIG. 3B.

Each browser window, in addition to displaying information retrieved from one or more databases, may also be capable of receiving information entered through the internal user interface and information entered through the external user interface. For example, customers or CSRs may change user profile information, such as address or telephone numbers, passwords, or the like, by selecting appropriate data entry screens via the browser. Such information is then stored in the appropriate database without further human intervention or computer processing.

Both the CSR and the customer have the capability to provide instructions from their respective user interfaces, to be further processed automatically. For example, a customer wanting to transfer money from one account to another selects the appropriate transaction screen using the shared browser and enters information relating to the transfer in that transaction screen. The transfer instruction is then sent to a processor for performing the appropriate subroutines necessary to complete the transaction. In the alternative, the customer may ask the CSR to make the entries necessary to initiate the transaction. The CSR may have additional transactional capabilities not provided to the customer. For example, a customer may have one account in his own name, and another account held in trust for another family member. The customer may not be allowed to move funds between those accounts directly using the external user interface, but the CSR may be able to perform such a transaction at the request of the customer, in accordance with other rules and safeguards. The computer processor may have rules and safeguards programmed into it governing what transactions may be completed by the customer and/or the CSR, taking into account legal requirements and other considerations, and may provide error messages disallowing transactions that are not permitted.

Figure 4:
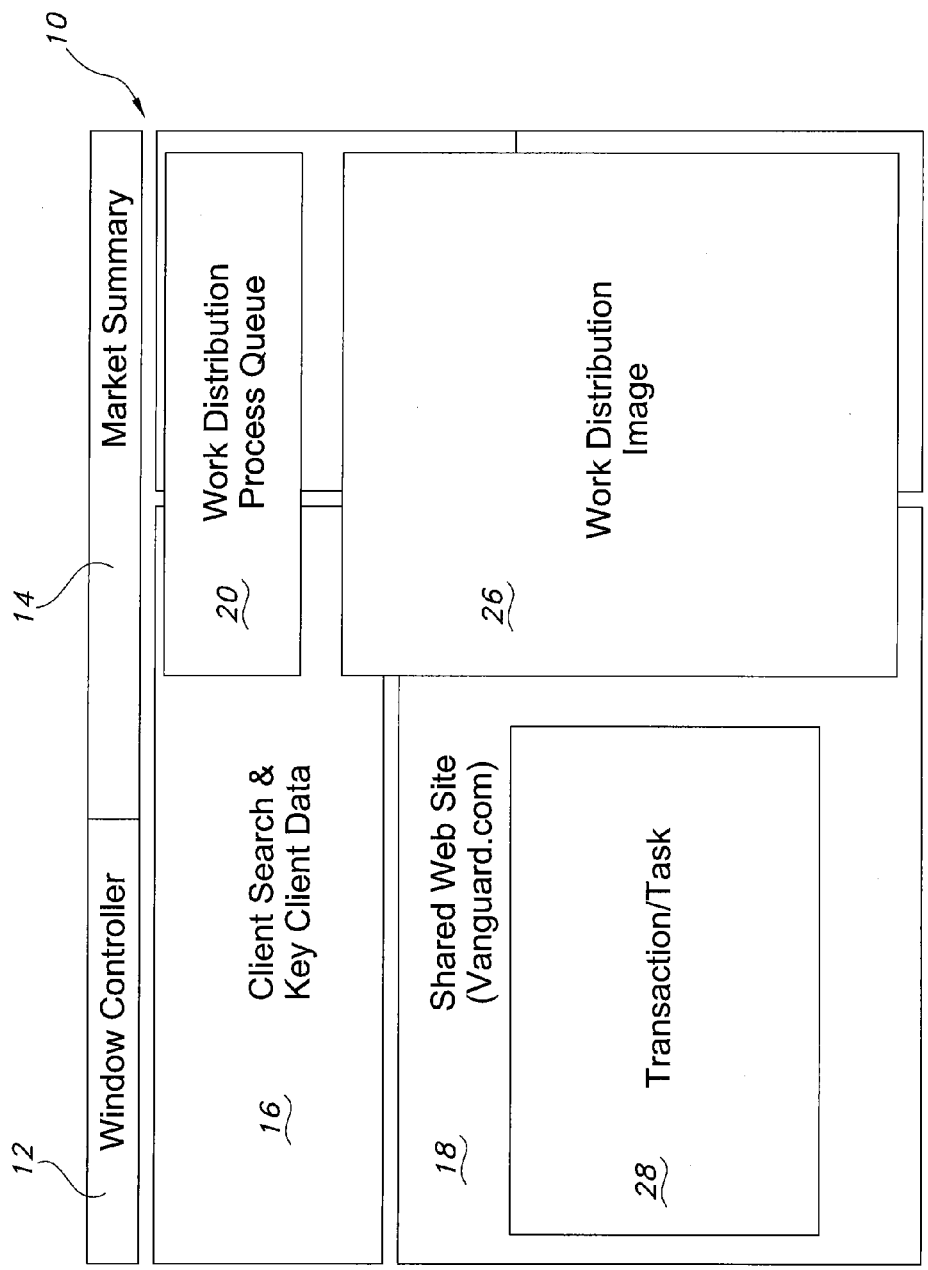
FIG. 4 shows a schematic illustration of the exemplary interface of FIG. 1, showing exemplary positioning of overlapping display areas for windows from a computerized work-distribution system.

In addition to the phone-based CSRs, the service provider may also employ representatives who handle mail communications and who also need access to the internal user interface. Mail communications handlers may use a computerized work distribution system, such as is shown schematically in FIG. 4. The work distribution system overlays the desktop shown in FIG. 2 with a process queue window 24, an image window 26 for showing the document to be processed, and a transaction window 28. Fewer or additional windows may also be present, and the windows may be positioned anywhere overlaying the desktop and may be further movable by CSRs according to need or personal preference.

Incoming mail is typically opened and immediately scanned by one workgroup of the service provider to create the images 26 that are entered into the work distribution system. The work distribution system may be able to identify customer information and the type of processing task required, based upon character recognition and/or encoding on the scanned forms, and/or additional workers may pre-screen each scanned form and characterize the nature of the transaction to be processed. Thus, when the work arrives at the CSR from the pre-screening step, it may come with coding that immediately pre-populates the underlying desktop (windows 16, 18, and 20 as shown in FIGS. 2-3B) with the client's information, and may further accelerate navigation of the shared browser 18 to the screen necessary for entering transaction data, for easy access of additional information by selection of the pertinent window. Where the work distribution system is unable to recognize the proper transaction, a menu (not shown) may first appear in the transaction window 28 from which the CSR may choose the correct option. CSRs then process the imaged documents using the transaction window 28.

Figure 5:
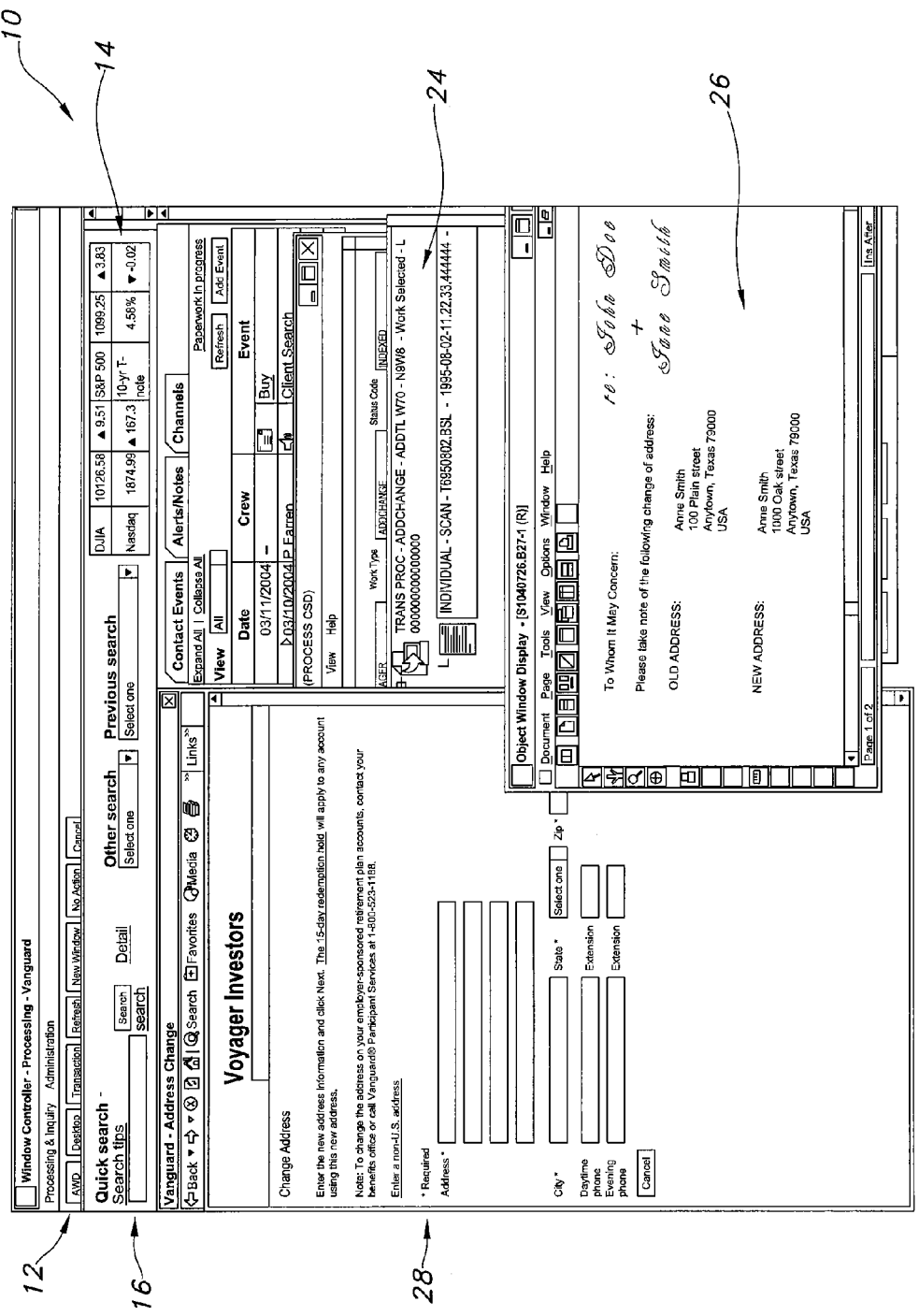
FIG. 5 shows a screenshot of an exemplary internal user interface embodiment with overlaid, populated, exemplary work distribution screens.

The transaction window may comprise a window normally accessible from the shared browser by either the customer or the CSR, in which case the shared website transaction window may automatically navigate to the correct screen for data entry or to a menu from which the correct screen can be chosen. The transaction screen may be a "pop-up" screen as shown in FIG. 5, or merely a different screen that fills the entire shared website browser window 18 (not shown), depending upon the normal functionality of the browser. Computerized work distribution systems are known in the art, such as for example, Automated Work Distributor™ (AWD®) from DST Systems of Kansas City, Mo. Nevertheless, the integration with an internal user interface used by call-center CSRs for accessing customer information and which has the same format and functionality as an external user interface used by customers is novel. Many of the functions that can be performed by mail-handler CSRs using the work distribution systems are functions that can also be performed by telephone CSRs and customers, all using the same on-screen transaction forms.

A screen shot of exemplary screen overlays corresponding to an exemplary work distribution system is shown in FIG. 5, depicting an address change notification form in the image screen 26 and a change of address entry pop-up screen in the transaction screen 28. As shown in FIG. 5, the work distribution system completely covers the normal desktop. The CSR can toggle back and forth between the "AWD" tab and "Desktop" tab in the Windows controller to view the desired information.

Although the screenshots shown in FIGS. 3A-3H are only exemplary embodiments of the types of information that may be available to both the call-center and mail-handler CSRs as well as the customer in a particular financial services embodiment, they are useful for discussion of the types of information that can be displayed, entered, and stored as well as transactions that can be completed using the user interfaces. As noted previously, FIG. 3A shows an exemplary internal user interface, displaying within the shared browser window 18 the information displayed when the "Accounts and Activity" subtab (note the double arrow before the title) under the "My Portfolios" tab is selected. Within this screen, users can see the investments of the users, in terms of account names, numbers, shares, price and change, and value. Note that the highlighted field "Yield" is only viewable by the CSRs. Similarly, other highlighted lines within the screen are only viewable by the CSRs.

Also, as noted previously, FIG. 3B shows another exemplary internal user interface, usable by a CSR who does not have access to the needs assessment tool, in which the Key Data subtab has been selected in the shared website browser 18. This screen is viewable only by CSRs and the tab therefore typically has a different color than the other tabs. The Key Data tab color is typically the same color as the highlighting for all of the other CSR-only information.

Figure 3C:
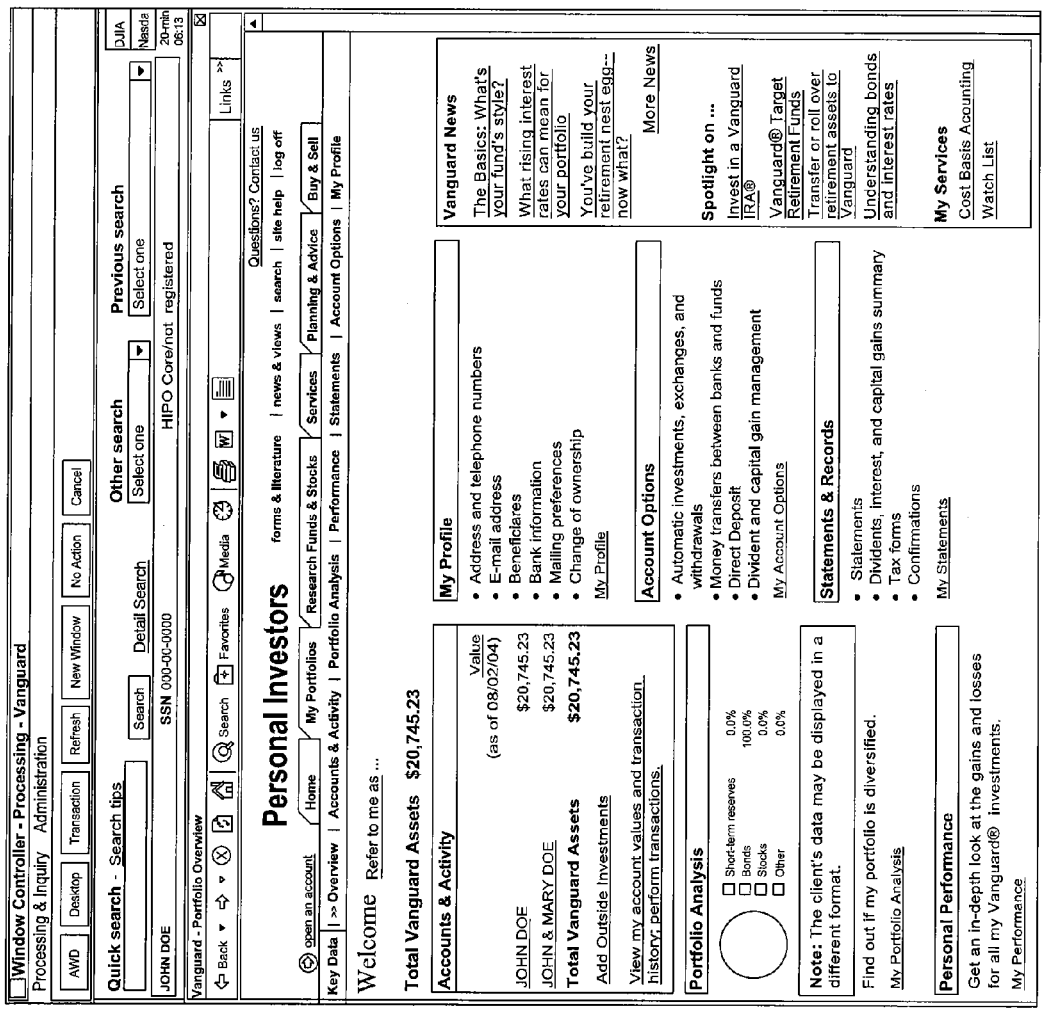
FIG. 3C shows a screenshot of an exemplary internal user interface embodiment displaying information shown when selecting the "Overview" subtab under the "My Portfolios" tab.

FIGS. 3C-3H show only a partial view of the user interface, including the shared website browser and the portions of the interface viewable above it, but not the contact history or needs assessment browsers. FIG. 3C shows the information displayed by selecting the "Overview" tab. The overview screen provides lists of information available under the other tabs (i.e. Accounts & Activity, Portfolio Analysis, Account Options, etc.), and provides shortcuts to the screens accessible by those tabs or to subscreens underneath those tabs by clicking on underlined text.

Figure 3D:
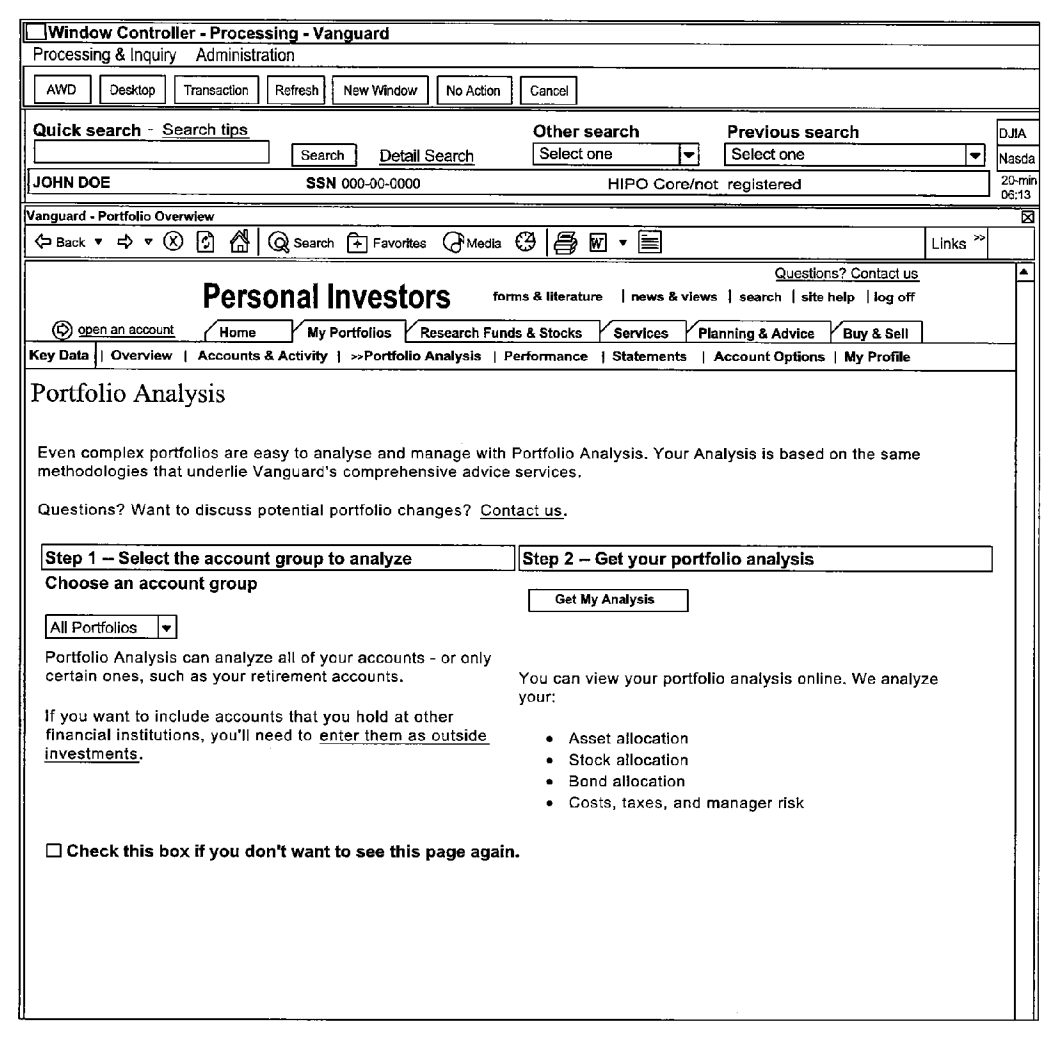

FIG. 3D shows information viewable by selecting the "Portfolio Analysis" tab. The CSR can use this screen to get the same analysis as a customer gets when using this screen and can therefore assist a customer who has questions about the analysis provided using this feature.

Figure 3E:
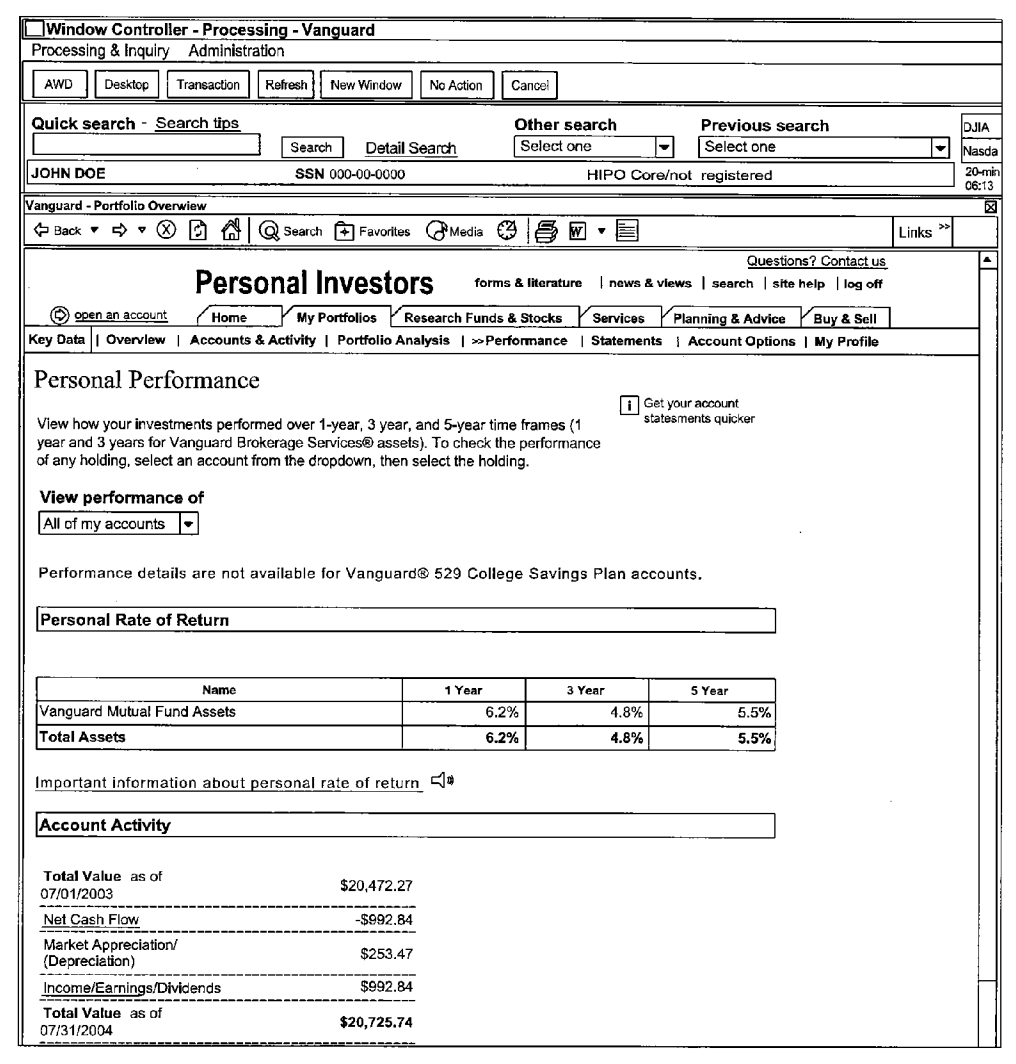

FIG. 3E shows a personal performance summary that provides a personal rate of return for the set of investments held by the customer. Although the example shows only a single fund, for an investor with multiple funds, the personal performance tab provides a rate of return customized for that customer's portfolio.

Figure 3F:
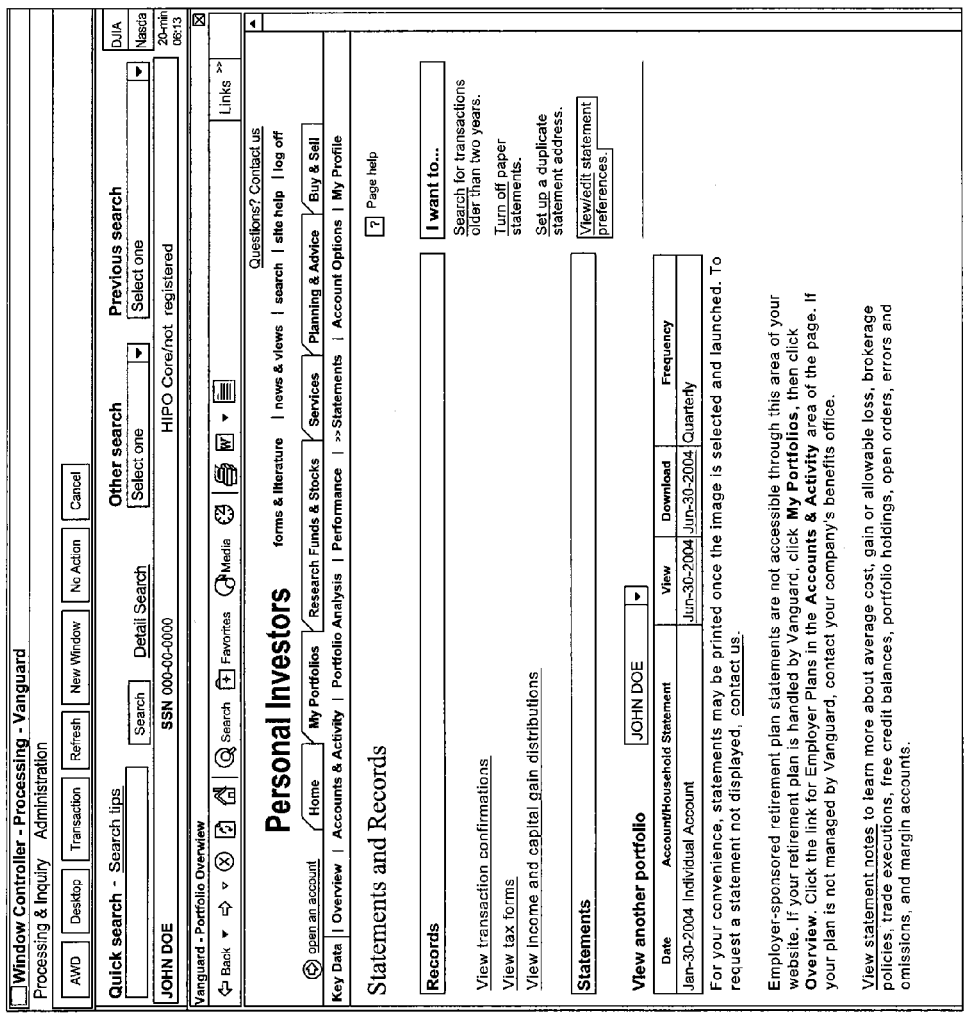
FIG. 3F shows a screenshot of an exemplary internal user interface embodiment displaying information shown when selecting the "Statements" subtab under the "My Portfolios" tab.

FIG. 3F shows the information viewable by selecting the "Statements" tab. The customer is able to view transaction confirmation, tax form, income and capital gain distribution records, as well as past and current statements. The feature shown to the right captioned "I want to . . . " provides shortcuts to screens where the CSR or user can make changes to data stored for that customer. For example, "Turn off paper statements" allows the user to change the customer profile so that paper statements are no longer received, such as for users who may only want electronic records. This change can be initiated by either the CSR or the customer. The "View/edit statement preferences" line is highlighted, meaning that only CSR can make changes to that set of data. The listed shortcuts under the "I want to . . . " heading may be tailored, using certain logic or rules, to the specific customer and may reflect common functions launched from that screen by similarly situated customers, or common functions that are otherwise not available on the screen but for which customers may be likely to look for on that screen.

Figure 3G:
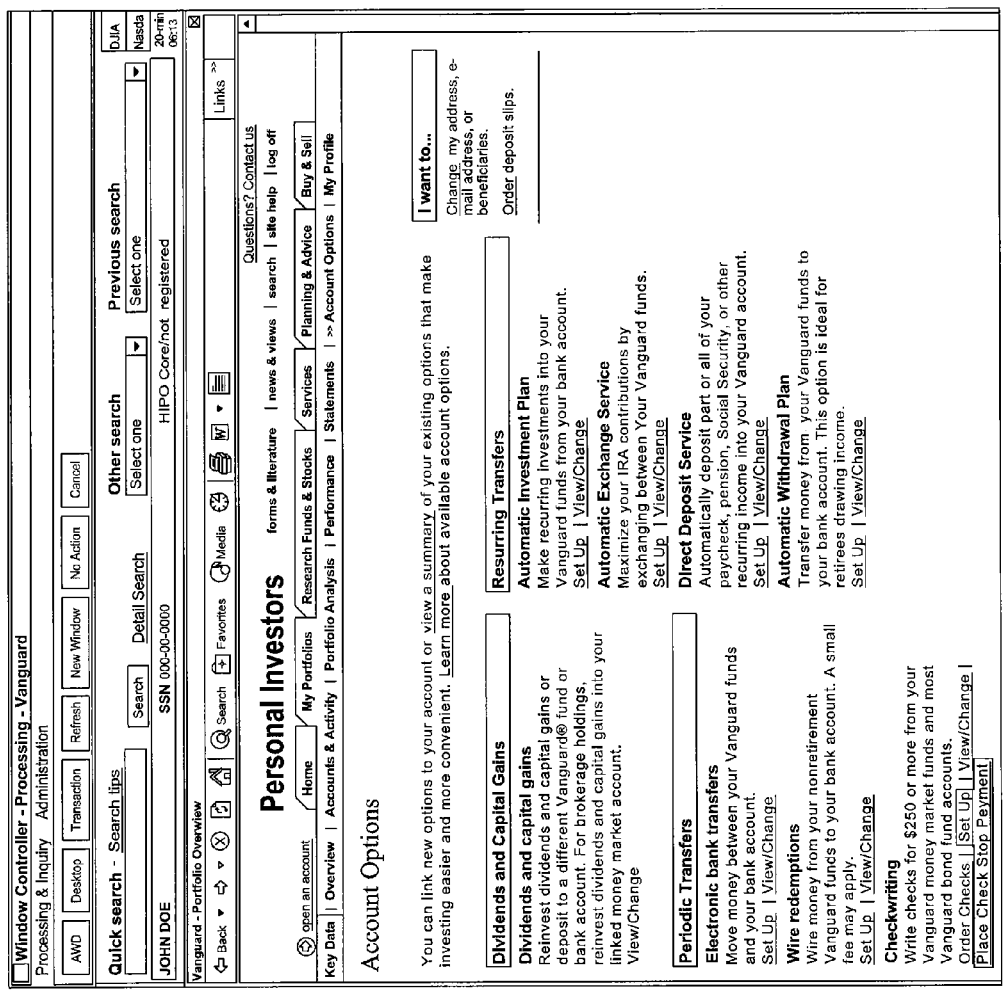
FIG. 3G shows a screenshot of an exemplary internal user interface embodiment displaying information shown when selecting the "Account Options" subtab under the "My Portfolios" tab.

FIG. 3G shows the information viewable by selecting the "Account Options" tab. This screen that offers a number of selections that, except for highlighted selections available only to the CSR, both the CSR and the customer can choose to make changes to customer data or process transactions. For example, the user profile can be changed so that dividends or capital gains realized from particular investments can be reinvested or deposited in a different account by selecting the "view/change" tab under the "Dividends and Capital Gains" heading and making additional selections on screens that follow. Transactions can also be effected from this screen, such as indicated under "Electronic bank transfers," moving money between the service provider (Vanguard) account and the customer's bank account. Certain transactions can only be effected by the CSR, however, such as setting up the customer to be able to write checks and placing a stop payment on a check. The customer can also set up automatic deposits into accounts managed by the service provider, automatic withdrawals from the funds into bank accounts managed by others, request exchanges between funds, and set up direct deposit of funds into the service provider accounts.

Thus, the customer or CSR are able to make substantial banking transactions automatically using the exemplary screen shown in FIG. 3G, which is, except for the highlighted areas, identical in format and functionality for both the CSRs and the customer. It should be noted that it is possible for a call-center CSR, a customer, and a mail-handling CSR all to be viewing the same screen at the same time and all to make data changes or conduct transactions from that screen at the same time. Where a mail-handling CSR receives a written instruction to move money between funds, the computerized work distribution system automatically navigates the browser to the same screen available by clicking on the tabs under the "Electronic bank transfers" heading.

FIG. 3H shows the information displayed when the "My Profile" subtab is selected. Changes in personal information, mailing preferences, and security and permissions can all be changed from this screen. Note that for security purposes, many of these changes are highlighted, and therefore available only to the CSR.

Figure 6:
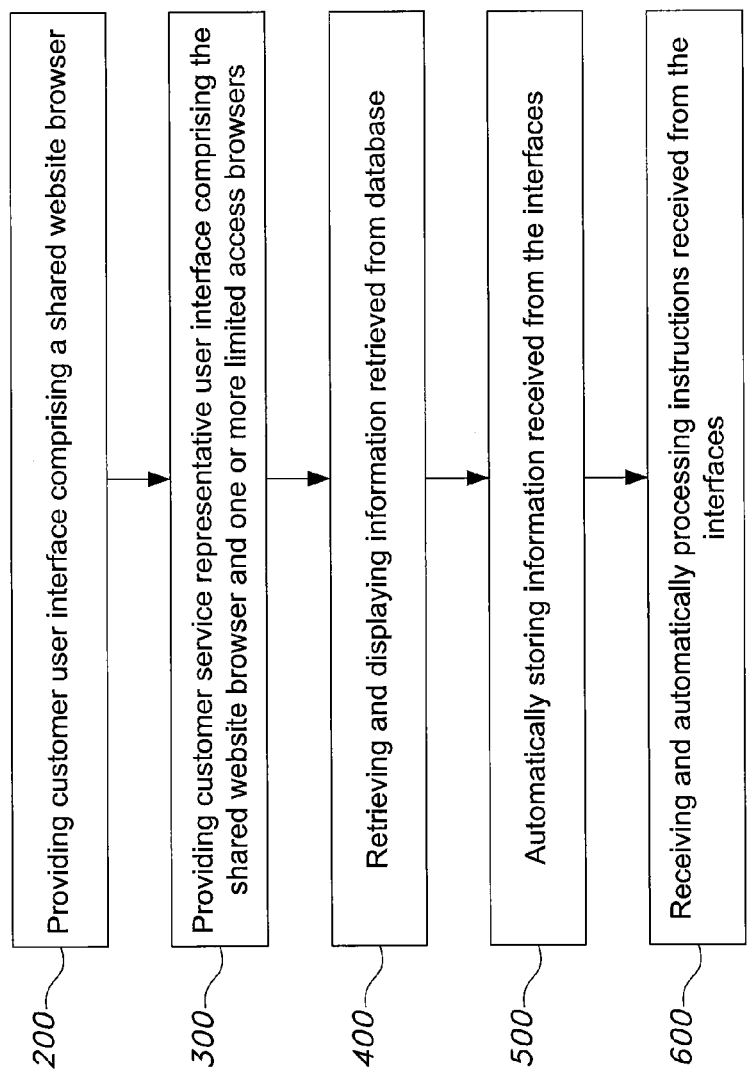
FIG. 6 depicts a flowchart of an exemplary method in accordance with the invention.

The flowchart shown in FIG. 6 depicts the basic method steps in accordance with one embodiment of the invention. Step 200 comprises providing an external user interface accessible by customers, the external user interface comprising a shared website browser as described herein. Step 300 comprises providing an internal user interface accessible by one or more CSRs, including the shared website browser and one or more limited access browsers accessible only by the CSR, as described in more detail herein. Step 400 comprises retrieving from one or more databases and displaying information on the interfaces. Step 500 comprises automatically storing information entered via the interfaces in the one or more databases, and step 600 comprises receiving and automatically processing instructions entered via the interfaces. Additional steps may also be present. The steps do not have to be performed in any particular sequence. As noted previously, the one or more limited access browsers in the internal user interface comprise: a client search browser that allows the CSR to locate computerized records for the customer; a client data browser that displays information about the customer; a contact history browser that displays previous contacts by the customer; a dialogue-prompting browser that displays suggested dialogue for use by the CSR in conversing with the customer; or a combination thereof.

Another aspect of the invention comprises the computerized system for facilitating interaction with a caller who calls a telephone number to receive customer service. Such a system generally comprises various means for carrying out the steps shown in FIG. 6, and specifically may comprise a processor 104 and memory media 106 having one or more databases stored therein and programmed for instructing the processor to carry out the steps shown in FIG. 6.

Figure 7:
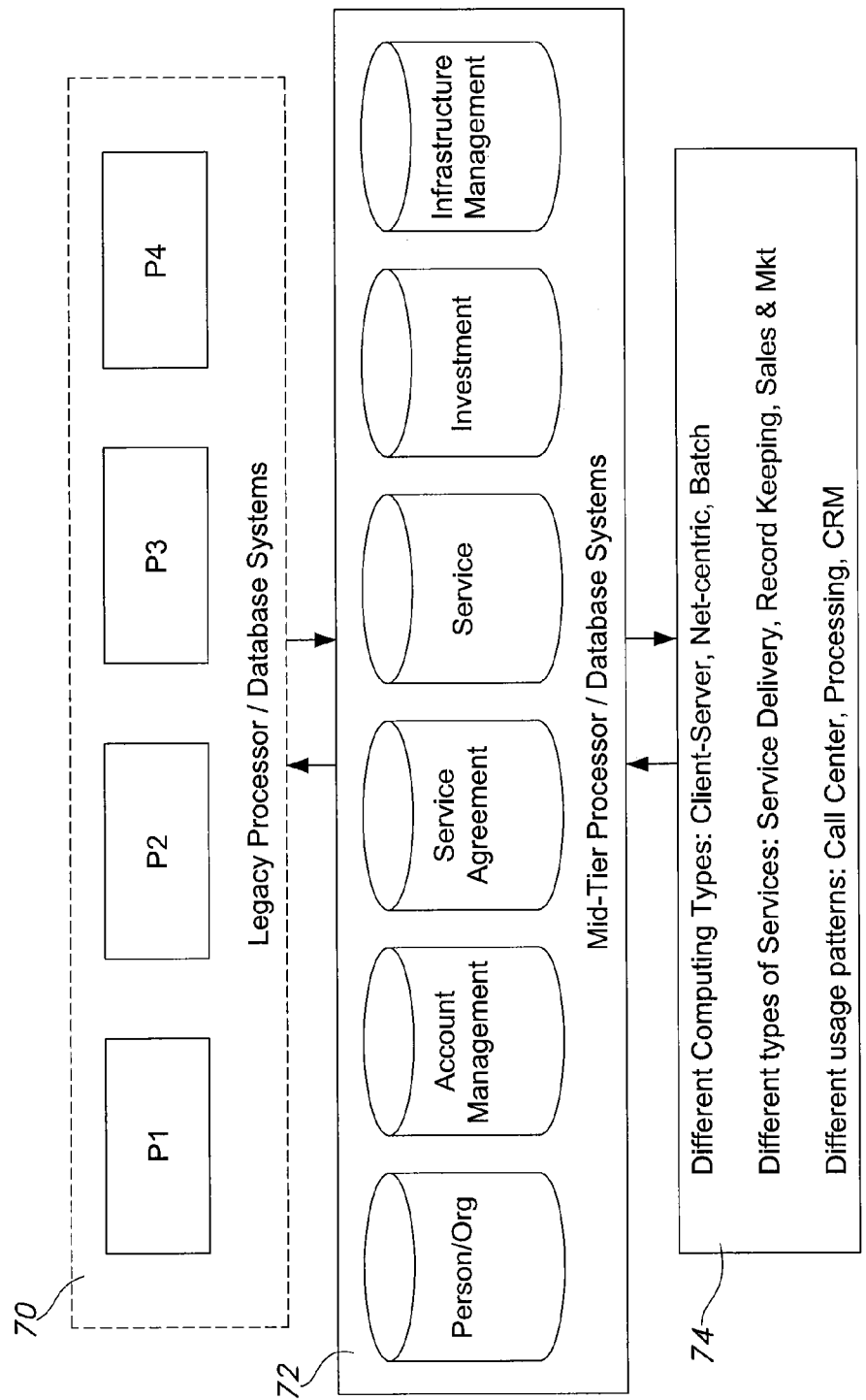
FIG. 7 depicts a schematic representation of an exemplary relationship among a user interface, a mid-tier processor, and legacy systems.

In one embodiment of the invention, the system may have an architecture as shown in FIG. 7, in which a mid-tier processor and database system 72 is positioned between legacy systems 70 and the user interface 74. Legacy systems P1-P4, originally programmed only for internal use by CSRs, may hold the data and processing capability to conduct transactions. For example, a financial services organization may have one legacy system for handing mutual fund transactions, another for bond transactions, another for brokerage transactions, another for institutional programs such as 401K programs, and the like. Both the internal and external user interfaces are optimally HTML-based, web-driven interfaces that display the same data originally available through the legacy systems, but in an HTML format. The mid-tier processor and database translates the commands from the user interfaces to provide instructions to the legacy systems for processing. The mid-tier processor also retrieves data from the legacy systems for posting on the user interface, and receives data from the user interface for storing in the legacy systems. Where the legacy systems are not able to handle all of the data or processing capability required to provide the desired functionality, the mid-tier processor may provide additional processing and data storage capability. For example, the mid-tier system typically contains many of the rules and logic regarding whether a customer or CSR is able to conduct a certain transaction, and may provide error messages or guidance to the user interface accordingly.

The mid-tier system may also communicate between the legacy systems, the computerized work distribution system, and the user interface, to allow the client identification and task type coding received through the work distribution system to cause the user interface to be populated with client information and the internal user interface shared browser to be accelerated to the transaction entry screen, as described above. Furthermore, the mid-tier system assigns a confirmation number to each transaction, whether performed by the customer or the CSR. This is important, for example, if the instructions accepted by the mid-tier system and passed on to the legacy system for processing for some reason is not able to be completed. A link from the mid-tier system to the work distribution system from the legacy system may allow the transaction information that was not processed by the legacy system to be passed to the work distribution system for another CSR to troubleshoot the reason the transaction was not completed. The confirmation number allows tracking of the status of each transaction, even if it has been kicked out to the work distribution system from the legacy system.

Although usable in any customer service context, the invention as described herein may be particularly useful in the financial services industry, where customers may frequently have questions regarding their current holdings and potential future investments, and in which service providers experience a large volume of customer service requests daily.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for providing customer service by a service provider, the method comprising the steps of:
   (a) providing via a computer system an external user interface remotely accessible by a plurality of customers via a global computer information network, the external user interface comprising a shared website browser that displays information in a specific format, has a specific functionality, and receives information entered by the customers for processing;
   (b) supplying via a computer system an internal user interface accessible by a plurality of call-center customer service representatives (CSRs), the internal user interface comprising a plurality of browsers and access to an integrated computerized work distribution system displayed on a computerized desktop, the internal user interface comprising (i) the shared website browser that displays information in the specific format, has the specific functionality, and receives information entered by the CSRs for processing, (ii) one or more limited access browsers accessible only by the CSRs, the one or more limited access browsers configured to provide: a client search function that allows the CSRs to locate computerized records for the customers; a client data function that displays information about the customers; a contact history function that displays previous contacts to the service provider by the customers; a customer needs assessment function that displays information for assisting the CSRs in conversing with the customers; or a combination thereof, and (iii) access to images of paper-based documents including mail correspondence;
   (c) displaying information retrieved from one or more databases on the internal user interface and the external user interface, including displaying critical information about the customers in the shared website browser of only the CSRs, said critical information highlighted relative to information viewable by both the customers and the CSRs;
   (d) automatically storing in the one or more databases information entered via the internal user interface and information entered via the external user interface; and
   (e) receiving and automatically processing transaction instructions entered via the internal user interface and transaction instructions entered via the external user interface.

2. The method of claim 1, wherein the contact history function displays information regarding previous telephone calls, website transactions, and mail correspondence with the service provider.

3. The method of claim 1, wherein the critical information includes customer address, customer social security number, and customer phone number information.

4. The method of claim 1, wherein the plurality of limited access browsers are further configured to provide a client data function that displays the critical information about the customers.

5. The method of claim 4, wherein the client search function and the client data function are integrated together in a single browser.

6. The method of claim 1, wherein the shared website browser displays information about client preferences regarding set-up of the user interface of the customer, such client preference information viewable only by the CSRs.

7. The method of claim 1, wherein the needs assessment function displays prompts for engaging the customers in a dialogue for identifying additional needs of the customers that may be serviceable by the CSRs.

8. The method of claim 1, wherein the service provider is a provider of financial services.

9. The method of claim 1, wherein the shared website browser is also accessible by mail-processing CSRs.

10. The method of claim 9, the method steps further comprising:
(f) the internal user interface automatically populating the shared website browser and the one or more limited access browsers with client information based upon information automatically communicated from the computerized work distribution system.

11. The method of claim 9, the method steps further comprising:
(f) automatically navigating the internal user interface shared website browser to one of a plurality of selected menus or screens within the shared website browser based upon the information received from the computerized work distribution system.

12. The method of claim 9, wherein the internal user interface provides display screens for the computerized work distribution system overlaid upon the shared website browser and the plurality of limited access browsers, when the computerized work distribution system is activated.

13. A method for providing customer service for a financial services provider, the method comprising the steps of:
(a) providing via a computer system an external user interface remotely accessible by customers via a global computer information network, the external user interface comprising a shared website browser that displays information in a specific format, has a specific functionality, and receives information entered by customers for processing;
(b) supplying via a computer system an internal user interface accessible by one or more call-center customer service representatives (CSRs), the internal user interface comprising a plurality of browsers and access to an integrated computerized work distribution system displayed on a computerized desktop, the internal user interface comprising (i) the shared website browser that displays information in the specific format, has the specific functionality, and receives information entered by the CSRs for processing, the shared website browser displaying, in addition to information viewable by the customers, critical information about the customers viewable only by the CSRs, said critical information highlighted relative to information viewable by both the customers and the CSRs, (ii) an integrated client search and client data function that allows the CSRs to access and display critical information about a selected customer; (iii) a contact history function that displays previous telephone calls, website transactions, and mail correspondence with the service provider by the selected customer; (iv) access to images of paper-based documents including mail correspondence; and, optionally, (v) a customer needs assessment function that displays information for assisting the CSRs in conversing with the selected customer;
(c) retrieving from one or more databases and displaying information on the internal user interface and the external user interface;
(d) automatically storing information entered via the internal user interface and information entered via the external user interface, in the one or more databases; and
(e) receiving and automatically processing transaction instructions entered via the internal user interface and transaction instructions entered via the external user interface.

14. The method of claim 13, wherein the internal user interface is also accessible by mail-processing CSRs and integrated with the computerized work distribution system, the method steps further comprising:
(f) automatically populating the internal user interface shared website browser and the one or more limited access browsers with client information based upon information automatically communicated from the computerized work distribution system; and
(g) automatically navigating the internal user interface shared website browser window to one of a plurality of selected menus or screens within the shared website browser based upon the information received from the computerized work distribution system.

15. A computerized system for facilitating interaction with a caller to a call-center of a service provider, the system comprising:
means for providing an external user interface remotely accessible by customers via a global computer information network, the external user interface comprising a shared website browser that displays information in a specific format, has a specific functionality, and receives information entered by customers for processing;
means for supplying an internal user interface accessible by one or more call-center customer service representatives (CSRs), the internal user interface comprising a plurality of browsers and access to an integrated computerized work distribution system accessible on a computer desktop, the internal user interface comprising (i) the shared website browser that displays information in the specific format, has the specific functionality, and receives information entered by the one or more CSRs for processing, the shared website browser configured to display, in addition to information viewable by the customers, critical information about the customers viewable only by the CSRs, said critical information highlighted relative to information viewable by both the customers and the CSRs, (ii) one or more limited access browsers accessible only by the one or more CSRs, the one or more limited access browsers configured to provide: a client search function that allows the one or more CSRs to locate computerized records for a selected one of the customers; a client data function that displays information about the selected customer; a contact history function that displays previous contacts with the service provider by the selected customer; a dialogue-prompting function that displays suggested dialogue for use by the one or more CSRs in conversing with the selected customer; or a combination thereof, and (iii) access to images of paper-based documents including mail correspondence;

means for storing one or more databases accessible by the internal user interface and the external user interface, from which information is retrieved and displayed by the external user interface and the internal user interface and in which information entered via the internal user interface and information entered via the external user interface, is automatically stored; and means for receiving and automatically processing transaction instructions entered via the internal user interface and transaction instructions entered via the external user interface.

16. The computerized system of claim 15, wherein the internal user interface is accessible to both call-center and mail-processing CSRs and is integrated with the computerized work distribution system, the system further comprising:

(f) means for automatically populating the internal user interface shared website browser and the one or more limited access browsers with client information based upon information automatically communicated from the computerized work distribution system; and (g) means for automatically navigating the internal user interface shared website browser to one of a plurality of selected menus or screens within the shared website browser based upon the information received from the computerized work distribution system.

17. A computer system for facilitating interaction with a caller to a customer service call center, comprising:

one or more processors;

one or more memory media accessible by the one or more processors, the memory media containing one or more databases and containing instructions for controlling the processor, the instructions causing the processor to effect steps of:

(a) providing an external user interface remotely accessible by customers via a global computer information network, the external user interface comprising a shared website browser that displays information in a specific format, has a specific functionality, and allows entry of information by the customers for processing;

(b) providing an internal user interface comprising a plurality of browsers and access to an integrated computerized work distribution system accessible on a computer desktop of a customer service representative (CSR), the internal user interface comprising (i) the shared website browser that displays information in the specific format, has the specific functionality, and receives information entered by the customer for processing, (ii) one or more limited access browsers accessible only by the CSR, the one or more limited access browsers configured to provide: a client search function that allows the CSR to locate computerized records for the customers; a client data function that displays information about the customers; a contact history function that displays previous contacts by the customers; a customer needs assessment function that displays information for assisting the CSR in conversing with the customers; or a combination thereof, and (iii) access to images of paper-based documents including mail correspondence;

(c) retrieving from the one or more databases and displaying information on the internal user interface, external user interface, or both, including displaying client data comprising critical information about the customers in the shared website browser of only the CSR, said critical information highlighted relative to information viewable by both the customers and the CSR;

(d) automatically storing information entered via the internal user interface and information entered via the external user interface in the one or more databases; and (e) receiving and automatically processing transaction instructions entered via the internal user interface and transaction instructions entered via the external user interface.

18. The system of claim 17, wherein the one or more processors and the one or more memory media comprises one or more legacy systems and one or more mid-tier systems for passing data and instructions between the user interfaces and the legacy systems.

19. The system of claim 17, wherein the internal user interface is accessible to both call-center and mail-processing CSRs and is integrated with the computerized work distribution system, the system further comprising instructions for causing the processor to effect steps of:

(f) automatically populating the internal user interface of the shared website browser and the one or more limited access browsers with client information based upon information automatically communicated from the computerized work distribution system; and (g) automatically navigating the shared website browser window to one of a plurality of selected menus or screens within the shared website browser based upon the information received from the computerized work distribution system.

* * * * *